Figure 1:
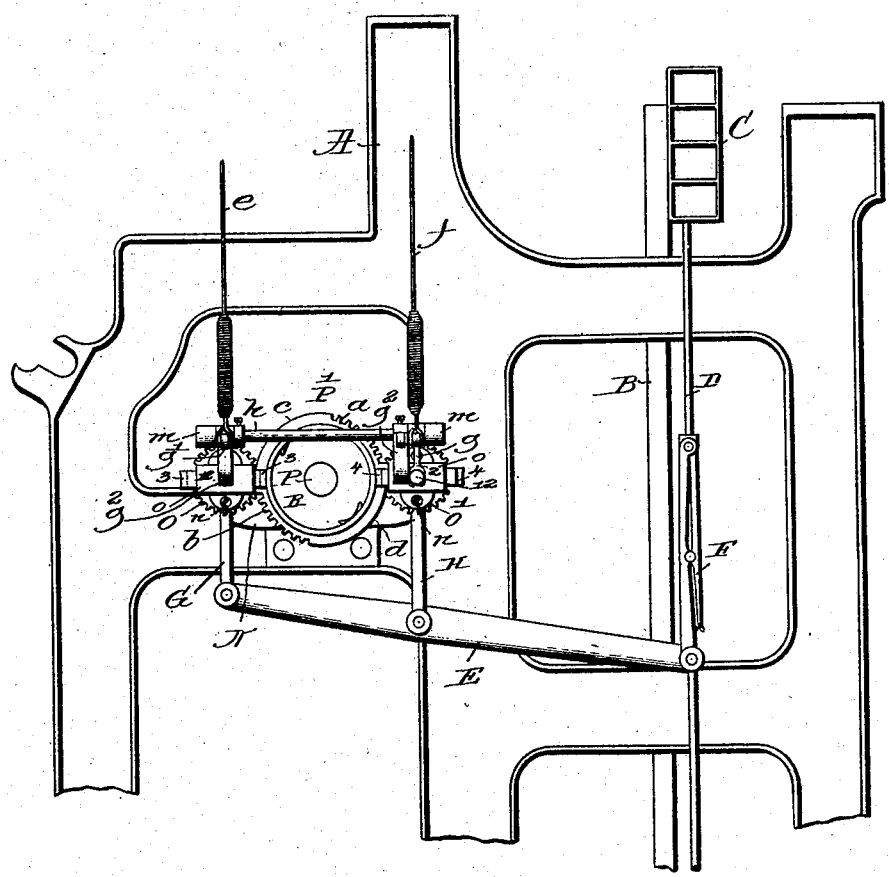

A. R. PATTEN.
MECHANICAL MOVEMENT.
APPLICATION FILED JUNE 21, 1907.

901,032.

Patented Oct. 13, 1908.
3 SHEETS—SHEET 1.

Witnesses
Fred. S. Grumbay.
Joseph M. Ward.

Inventor.
Alonzo R. Patten,
by Kenerly & Gregory
Attys

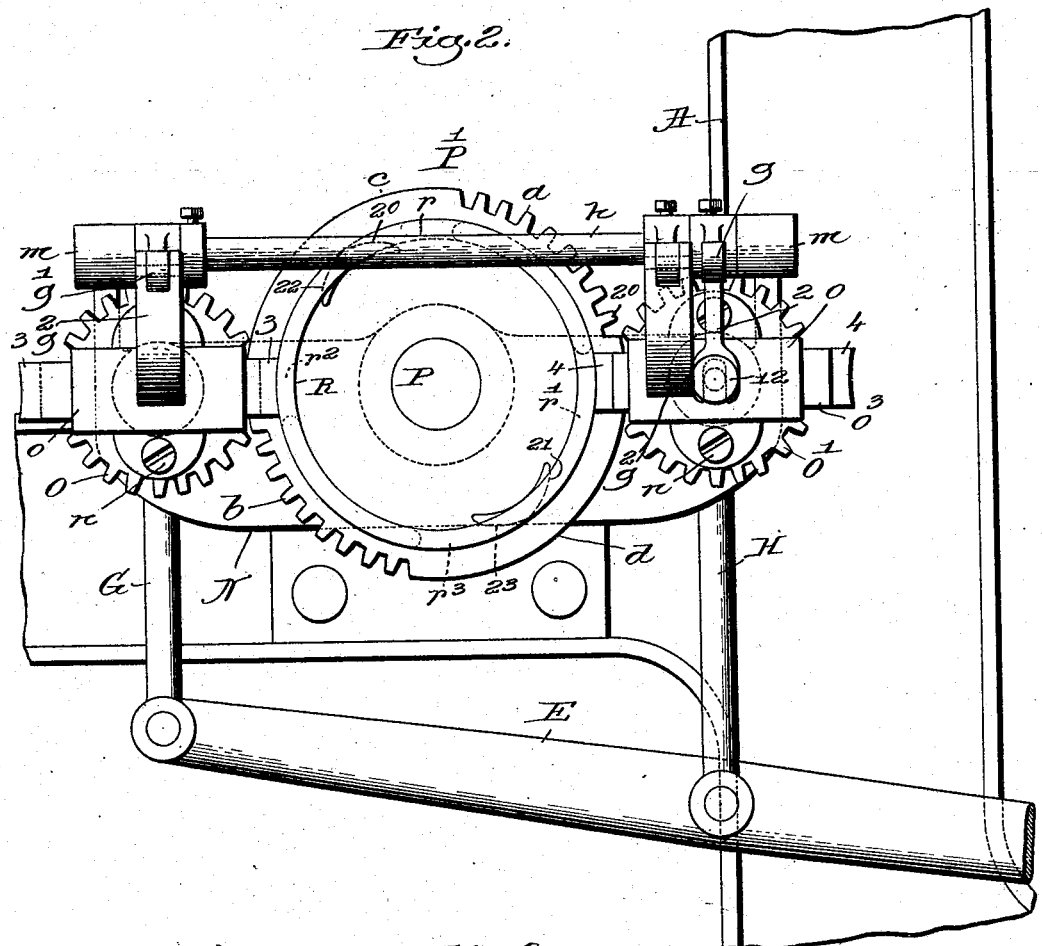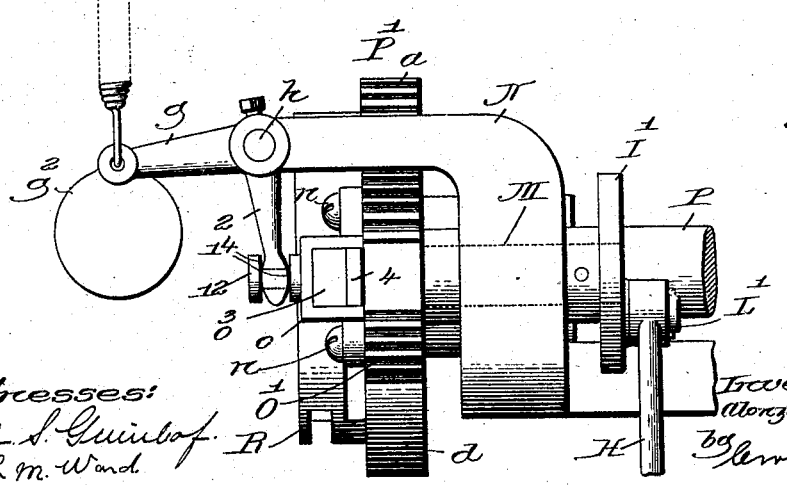

A. R. PATTEN.
MECHANICAL MOVEMENT.
APPLICATION FILED JUNE 21, 1907.
901,032.
Patented Oct. 13, 1908.
3 SHEETS—SHEET 3.
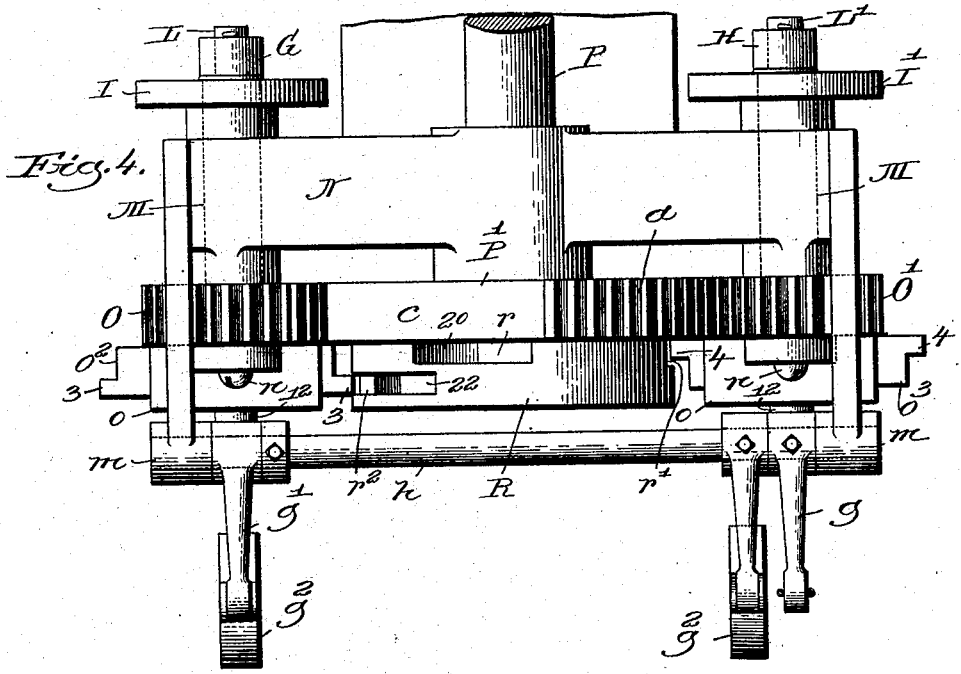
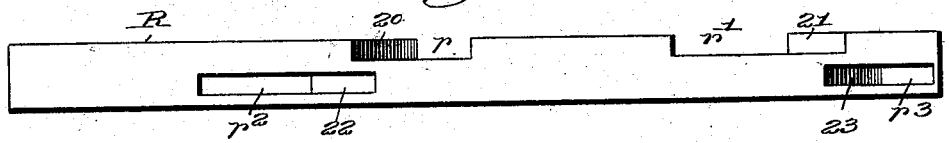
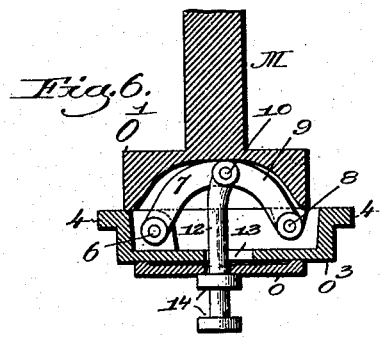
Witnesses:
Fred. S. Greenleaf.
Joseph M. Ward.
Inventor.
Alonzo R. Patten,
by Beverly Gregory
Attys.

UNITED STATES PATENT OFFICE.

ALONZO R. PATTEN, OF FALL RIVER, MASSACHUSETTS.

MECHANICAL MOVEMENT.

No. 901,032.  Specification of Letters Patent.  Patented Oct. 13, 1908.

Application filed June 21, 1907. Serial No. 380,055.

*To all whom it may concern:*

Be it known that I, ALONZO R. PATTEN, a citizen of the United States, residing in Fall River, in the county of Bristol and State of Massachusetts, have invented an Improvement in Mechanical Movements, of which the following description, in connection with the accompanying drawing, is a specification, like letters on the drawing representing like parts.

This invention has for its object the production of a novel mechanical movement adapted for imparting intermitting rotary movement to a shaft and attached parts from a continuously rotated shaft.

My novel mechanism may, among other things, be employed to great advantage in connection with looms for moving drop shuttle-boxes.

My invention is intended as an improvement on the class of mechanical movement illustrated and described in U. S. Patent No. 832,154 heretofore granted to me and dated October 2, 1906.

The patent referred to shows a so-called master gear having toothed and untoothed portions arranged in sets and alternating, and a plurality of short starting flanges, the latter being projected from the face of the master gear and striking the ends of like bolts arranged diametrically with relation to the longitudinal axes of usual mutilated pinions, said flanges starting said pinions that a toothed part thereof may be engaged by a toothed part of the master gear.

In my invention to be herein described, I have done away with the two starting flanges represented in said patent, and have provided the face of the master gear with a circular rim which has two functions, one to act upon a bolt projected from the mutilated pinion by pattern-controlled means to thus start said pinion that it may be engaged and rotated 180° by the master gear, and also said flange, by coacting with the bolts to be hereinafter described, prevents the accidental starting of a mutilated pinion while a toothed part of the master gear is revolving in an untoothed part of a mutilated pinion. The bolts herein shown are slid by a toggle or links under the control of pattern means, and the ends of these bolts in the form in which I have herein chosen to illustrate my invention enter notches in the rim referred to.

In the patent referred to the bolts were moved in one direction by a pattern-controlled device, and in the opposite direction by a spring connected at one end directly with said bolt and at its opposite end with the mutilated gear, but herein the bolts are shown as moved by a toggle or links.

Figure 1 in side elevation shows part of the end of a loom frame with which I have embodied my mechanical movement, illustrating the same as connected with a series of drop shuttle-boxes; Fig. 2 is a much enlarged detail showing my mechanical movement and part of a lever to be moved thereby; Fig. 3 is a detail of the parts shown in Fig. 2 looking at the same from its rear side; Fig. 4 is a top or plan view of the mechanism shown in Figs. 2 and 3; Fig. 5 is a development of the rim projecting from one side of the master wheel, and Fig. 6 is a detail of a mutilated pinion, one of the bolts and part of the mechanism employed for sliding the bolts at the desired times.

Referring to the drawings, A represents part of the end frame of a loom, B part of a lay; C a set of shuttle-boxes having four cells; D a shuttle-box rod; E a shuttle-box lever united with said rod through a suitable giveaway mechanism F; G and H links having pivots to connect the same with the shuttle-box lever; I and I' disks having cranks L, L' over which are fitted the upper ends of the links referred to, said disks being carried by short shafts or hubs M revoluble in suitable bearings of stands N supported from the end frame of the loom in any usual way, and carrying mutilated pinions O, O'. The parts so far referred to are and may be all common as in the patent referred to, and in other U. S. patents to Horace Wyman.

P represents a main driven shaft supposed to be the cam shaft of a loom sustained in usual manner and provided with a master gear P' herein shown as having two toothed sections *a, b* with intervening plain or untoothed portions *c, d*. The mutilated gears also have two toothed portions with intervening untoothed portions, and the untoothed portions of the master gear, when the latter is rotated, as well as the toothed portions thereof turn in the untoothed spaces of the mutilated pinions and prevent the same from being rotated until their rotation is called for by or through the action of usual pattern mechanism, which, in its operation, acting through suitable fingers commonly employed in looms, raises spring rods $e$ or $f$ connected at their lower ends with elbow levers $g$, $g'$, one of which may be mounted loosely on a rock-shaft $h$ having suitable bearings $m$, while the other is connected with said shaft. As herein shown, each lever $g$, $g'$ is represented as provided with a suitable device or weight $g^2$ acting normally to move the lower arms 2 of said levers inwardly or toward the loom frame. Each mutilated pinion has connected to its face by screws $n$ a like box $o$, the box of pinion O having a sliding bolt $o^2$, while the box of pinion O' has a bolt $O^3$.

Referring to the bolt $o^2$, see Fig. 4, it has at its ends projections 3 being located at the outer side of the bolt, and referring to bolt $o^3$, it has projections 4 at its inner side. These bolts, see Fig. 6, showing the mutilated pinion O' and bolt $o^3$, are made as hollow shells having each a stud 6 upon which is pivoted a link 7, while the pinion has a stud 8 upon which is pivoted a link 9, the inner ends of said links 7 and 9 being jointed by a pin 10 to a bolt mover 12 shown as a rod extended outwardly through a slot 13 in the bolt, and thence through a hole in the box $o$, the outer end of the rod being shaped to present two shoulders 14, to be engaged by the forked lower ends of arms 2 of the levers $g$ and $g'$, just alike. The master gear referred to has projecting from its outer side a rim R, it presenting greater strength than a segmental flange of the same thickness.

The rim, represented separately in Fig. 5 as detached from the master gear and shown as laid out or projected in a plane, is provided, as I have herein chosen to illustrate my invention, with a series of notches $r$, $r'$ next the face of the master gear, and other notches $r^2$, $r^3$ near the outer edge of the rim. The notches $r$ and $r'$ have respectively beveled portions 20 and 21, and the notches $r^2$ and $r^3$ beveled portions 22, 23. The notches $r$, $r'$ receive the projecting ends 4 of the bolt $o^3$, while the notches $r^2$, $r^3$ receive the projecting ends 3 of the bolt $o^2$.

When the pattern-controlled lever $g$ or $g'$ is moved upwardly by or through the action of any usual pattern, the bolt mover or rod 12 will be moved outwardly from the position Figs. 3 and 6, straightening the toggle composed of the links 7 and 9 and moving the inner end of the bolt so moved toward the master wheel that it may be struck by the rim R and so start the mutilated pinion that it may be engaged and turned through 180° by a toothed part of the master gear. The pattern surface holds the bolt projecting during this half rotation of the pinion, and thereupon the opposite end of the bolt comes in position next the master gear and occupies a position substantially in contact with the exterior of the rim R where it is held by the pattern surface and where it prevents the accidental starting of the pinion which might occur while the toothed part of the master gear is moving in an untoothed part of the pinion. The moving of the mutilated pinion by the master gear actuates the link G or H to move the lever E, and since the end of said lever is connected with a shuttle-box rod D will move the shuttle-box in one or the other direction as the exigencies of the weaving may demand. The operation, therefore, is in this wise. With the parts as shown in Fig. 2, let us suppose it is desired to operate the pinion O'. The pattern surface will move so as to exert an upward pull on the connection $f$, which will act to hold the left-hand end of the bolt 4 in Fig. 2 up against the rim of the master gear, the spring shown at the bottom of the connection $f$ yielding, until a slot in the rim comes opposite the end of the bolt, when the bolt will be projected into the slot $r$, or $r'$, and thereupon the teeth of the master gear will engage with the teeth of the pinion and the latter will be rotated by the former 180°, the pattern surface during this half rotation holding the bolt projected, that is, with the toggle 7, 9 straight. The other end of the bolt, that is the right-hand end shown in Fig. 2, will now come into the opposite position from that shown in Fig. 2, and its end will be in substantial contact with the exterior of the rim on the master gear, co-acting therewith and serving as an auxiliary locking device to prevent the accidental starting of the pinion. If, now, it is desired again to operate the pinion O', the pattern surface will act to lower the connection $f$, and the weight $g^2$ will tend to break the toggle 7, 9, and as soon as a slot $r$, $r'$ in the rim of the master gear comes opposite the end of the bolt the weight $g^2$ will break the toggle, and the right-hand end of the bolt shown in Fig. 2 but which now occupies the left-hand position, will be thrown into the slot in the rim and the continued rotation of the master gear will rotate the pinion O' through another 180°, until the parts assume the position shown in Fig. 2, with the left-hand end of the bolt therein shown acting as an auxiliary locking device against the rim to prevent the accidental rotation of the pinion. This position will be maintained until the operation of the pattern surface to raise the connection $f$ as before set forth. The operation of the pinion O is, of course, secured in a similar manner and need not be described.

Having described my invention, what I claim as new and desire to secure by Letters Patent is:—

1. In a mechanical movement, a master gear having a continuous circular rim projecting from the face thereof, a mutilated pinion and a sliding tooth crossing said pinion in the plane of said rim, the inner side of said tooth coacting with the outer side of said rim and preventing accidental starting of said mutilated pinion.

2. In a mechanical movement, a mutilated pinion having upon one face a transversely arranged sliding bolt, and a master gear provided with a continuous circular rim projecting from the face thereof and slotted at intervals, combined with means to move one end of said bolt into a slot of said rim that the latter may strike said bolt and start the mutilated pinion that it may be thereafter engaged and partially rotated by said master gear, the unslotted portion of said rim serving the purpose of an auxiliary locking device to restrain the rotation of the pinion while a toothed portion of said master gear is moving through an untoothed portion of said pinion.

3. In a mechanical movement, a rotatable master gear having at its side a rim provided with a notch, a shaft carrying said master gear, a parallel shaft a mutilated pinion thereon, a sliding bolt revoluble with said pinion, a link device connecting said gear and bolt, and means for moving said link device positively.

4. In a mechanical movement, a rotatable master gear having at its side a rim provided with a notch, a shaft carrying said master gear, a parallel shaft a mutilated pinion thereon, a sliding bolt revoluble with said pinion, a link device connecting said gear and bolt, and means connected with said link device to project one end of said bolt that it may engage a notch of said rim, the latter starting through said tooth the mutilated pinion that its teeth may be engaged by the teeth of the master gear and the mutilated pinion be turned for one-half of a rotation.

5. In a mechanical movement, a rotatable master gear having at its side a rim provided with a space, a shaft upon which said master gear is mounted, a parallel shaft a mutilated pinion thereon, a sliding bolt revoluble with said pinion, and a toggle joint connection between said pinion and bolt, combined with means coacting with said toggle to project one end of said bolt that it may enter the space of the rim connected with said master gear, said rim effecting the starting of the shaft having the mutilated pinion.

6. In a mechanical movement, a rotatable master gear having at its side a rim provided with a notch, a shaft carrying said master gear, a shaft parallel therewith a mutilated pinion thereon, a sliding bolt revoluble with said pinion, a connection between said bolt and pinion, and a device occupying a position in line with the longitudinal axis of the shaft of the mutilated pinion, and means to slide said device in the direction of the length of said shaft to move said bolt that its inner end may enter a notch in the rim of said master gear.

7. In a mechanical movement, a master gear having at one side a continuous rim provided with a series of spaces, a shaft carrying said master gear, two shafts parallel therewith, a mutilated pinion on each of said shafts, a sliding bolt carried by each of the mutilated pinions, and means to move said bolts that they may enter each one of the spaces of said rim.

8. In a mechanical movement, a master gear having at one side a continuous rim provided with a series of spaces, a shaft carrying said master gear, two shafts parallel therewith, a mutilated pinion on each of said shafts, a sliding bolt, and means to move said bolts that their inner ends may enter one of said spaces.

9. In a mechanical movement, a master gear having a rim provided with a plurality of spaces arranged in different lines, and a plurality of shafts a mutilated pinion on each of said shafts, a plurality of sliding bolts one coacting with each of said pinions, and means for actuating said bolts that they may engage each its own space in the rim of said master gear.

10. In a mechanical movement, a shaft, a diametrically sustained bolt, a link connected at one end with said bolt, the other end of said link being fixed with relation to said shaft, combined with means for moving said link to slide said bolt.

11. In a mechanical movement, a shaft, a diametrically sustained bolt, a link connected at one end with said bolt and at its other end with said shaft, a connection engaging said link between its ends, and means for moving said connection.

12. In a mechanical movement, a master gear having a rim provided with spaces arranged in different lines, a plurality of shafts a mutilated pinion on each of said shafts, a sliding bolt coacting with each of said mutilated pinions, means for actuating said bolts that they may be moved to engage the respective spaces in the rim of said master gear, cranks carried by the shafts having the master gears, a lever, and links connecting said lever with the cranks of the shafts carrying said mutilated pinions.

13. In a mechanical movement, a shaft, a master gear thereon having a rim provided with a series of notches arranged in different lines, shafts parallel with the shaft having the master gear, a mutilated pinion on each of said shafts, a bolt loosely mounted with relation to each of said mutilated pinions, one of said bolts having projections at its end in line with the outer side of said bolt, the other of said bolts having projections at its opposite ends in line with the inner side of said bolt.

In testimony whereof, I have signed my name to this specification, in the presence of two subscribing witnesses.

ALONZO R. PATTEN.

Witnesses:
GEO. W. GREGORY,
MARGARET A. DUNN.